(12) United States Patent
Niimi et al.

(10) Patent No.: US 8,008,371 B2
(45) Date of Patent: Aug. 30, 2011

(54) POLYCARBONATE RESIN COMPOSITION AND MOLDED ARTICLE THEREOF

(75) Inventors: Ryo Niimi, Chiyoda-ku (JP); Takashi Oda, Chiyoda-ku (JP); Akihiro Nitta, Chiyoda-ku (JP); Toshiaki Hotaka, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 266 days.

(21) Appl. No.: 12/448,405

(22) PCT Filed: Dec. 14, 2007

(86) PCT No.: PCT/JP2007/074586
§ 371 (c)(1),
(2), (4) Date: Jun. 19, 2009

(87) PCT Pub. No.: WO2008/075752
PCT Pub. Date: Jun. 26, 2008

(65) Prior Publication Data
US 2010/0021709 A1   Jan. 28, 2010

(30) Foreign Application Priority Data

Dec. 21, 2006 (JP) .................................. 2006-344252
Apr. 27, 2007 (JP) .................................. 2007-119005

(51) Int. Cl.
*C08K 5/3492* (2006.01)
*C08K 5/101* (2006.01)
*C08K 3/10* (2006.01)
*C08K 3/38* (2006.01)
*C08K 3/28* (2006.01)
*C08K 3/22* (2006.01)

(52) U.S. Cl. ........ 523/210; 524/100; 524/315; 524/403; 524/404; 524/413; 524/428; 524/430

(58) Field of Classification Search .................. 523/210; 524/100, 315, 403, 404, 413, 428, 430
See application file for complete search history.

(56) References Cited

U.S. PATENT DOCUMENTS

| 2004/0131845 | A1 | 7/2004 | Fujita |
| 2005/0161642 | A1* | 7/2005 | Takeda ........................ 252/500 |

FOREIGN PATENT DOCUMENTS

| JP | 2000-169765 | 6/2000 |
|---|---|---|
| JP | 2003-327717 | 11/2003 |
| JP | 2005-047179 | 2/2005 |
| JP | 2005-179504 | 7/2005 |
| JP | 2005-344006 | 12/2005 |
| JP | 2006-008428 | 1/2006 |
| JP | 2006-193376 | 7/2006 |
| JP | 2006-193670 | 7/2006 |
| JP | 2006-249345 | 9/2006 |
| JP | 2006-307171 | 11/2006 |
| JP | 2006-307172 | 11/2006 |
| JP | 2007-519804 | 7/2007 |

OTHER PUBLICATIONS

International Search Report issued Mar. 11, 2008 in International (PCT) Application No. PCT/JP2007/074586.
International Preliminary Report on Patentability issued Jul. 2, 2009 together with translation of PCT Written Opinion.

* cited by examiner

*Primary Examiner* — Kriellion A Sanders
(74) *Attorney, Agent, or Firm* — Wenderoth, Lind & Ponack, L.L.P.

(57) ABSTRACT

A resin composition which provides a molded article capable of effectively blocking off heat rays from sunlight and having excellent transparency, color and moist heat resistance and a molded article thereof. The resin composition comprises (A) 100 parts by weight of a polycarbonate resin (component A), (B) 0.0001 to 0.05 part by weight of coated hexaboride particles, each composed of a hexaboride particle of at least one element selected from the group consisting of Y, La, Ce, Pr, Nd, Sm, Eu, Gd, Tb, Dy, Ho, Er, Tm, Yb, Lu, Sr and Ca and a coating layer (component B), and (C) 0.0001 to 0.05 part by weight of nitride particles (component C).

16 Claims, 1 Drawing Sheet

POLYCARBONATE RESIN COMPOSITION AND MOLDED ARTICLE THEREOF

FIELD OF THE INVENTION

The present invention relates to a resin composition containing a polycarbonate and a molded article thereof. More specifically, it relates to a resin composition which provides a molded article capable of effectively blocking off heat rays from sunlight and having excellent transparency, color and moist heat resistance and a molded article thereof.

DESCRIPTION OF THE PRIOR ART

Hexaboride particles are known as a near infrared absorber (patent document 1). The surface of each hexaboride particle is hydrolyzed by vapor contained in the air or water, whereby the characteristic properties of the particle gradually deteriorate. Therefore, there is proposed a method for improving the water resistance of the hexaboride particle by coating the surface with a metal oxide such as silicon (patent documents 2 to 4).

In recent years, polycarbonate resin molded articles have been used as window materials for buildings, housing, automobiles, trains, aircraft, etc. In these application fields, the polycarbonate resin molded articles are required to block off heat rays from sunlight so as to suppress a temperature rise in a room or a car.

To meet the above requirement, a resin composition prepared by containing hexaboride particles in a polycarbonate resin is proposed (patent documents 6 to 12). However, this resin composition has a defect that the hydrolysis of the hexaboride particles is promoted by chlorine contained in the polycarbonate resin. That is, a polycarbonate resin manufactured by interfacial polymerization in which a diphenol and phosgene are reacted with each other in the presence of methylene chloride contains a trace amount of methylene chloride or a chloroformate group which is an unreacted residual group, and this chlorine promotes the above hydrolysis.

To reduce the influence of chlorine contained in this polycarbonate resin, use of a polycarbonate resin having a low content of chlorine is proposed (patent document 5). This proposal requires the step of removing chlorine contained in the polycarbonate resin and is therefore economically disadvantageous.

(patent document 1) JP-A 2000-169765
(patent document 2) JP-A 2006-8428
(patent document 3) JP-A 2006-193376
(patent document 4) JP-A 2006-193670
(patent document 5) JP-A 2006-249345
(patent document 6) JP-A 2003-327717
(patent document 7) JP-A 2005-47179
(patent document 8) JP-A 2005-179504
(patent document 9) JP-A 2007-519804
(patent document 10) JP-A 2005-344006
(patent document 11) JP-A 2006-307172
(patent document 12) JP-A 2006-307171

SUMMARY OF THE INVENTION

It is an object of the present invention to provide a resin composition which provides a molded article capable of effectively blocking off heat rays from sunlight and having excellent transparency, color and moist heat resistance and a molded article thereof.

When a polycarbonate resin is used as a material exposed to sunlight such as a window member, use of hexaboride particles as a near infrared absorber is proposed. However, the surface of each hexaboride particle is readily hydrolyzed by vapor contained in the air or water. The hydrolysis is promoted by chlorine contained in the polycarbonate resin.

Then, the inventors of the present invention have studied a method of suppressing the influence of chlorine contained in the polycarbonate resin. They have also studied a method of controlling the color of a polycarbonate resin containing hexaboride particles, which is apt to turn yellow.

As a result, they have found that when coated hexaboride particles which are hardly affected by water and chlorine (component B) are used as a near infrared absorber and nitride particles (component C) are used as a color control agent, a resin composition which provides a molded article having excellent moist heat resistance and color is obtained. The present invention has been accomplished based on this finding.

That is, the present invention is a resin composition which comprises (A) 100 parts by weight of a polycarbonate resin (component A), (B) 0.0001 to 0.05 part by weight of coated hexaboride particles (component B), composed of a hexaboride particle of at least one element selected from the group consisting of Y, La, Ce, Pr, Nd, Sm, Eu, Gd, Tb, Dy, Ho, Er, Tm, Yb, Lu, Sr and Ca and a coating layer, and (C) 0.0001 to 0.05 part by weight of nitride particles (component C).

In the present invention, the hexaboride is preferably La hexaboride. The coating layer is preferably made from a metal oxide. The coating layer preferably contains an oxide of at least one metal selected from the group consisting of Si, Ti, Al and Zr. The coating layer preferably contains Si oxide. The coating layer preferably consists of a pre-coating film of a surface modifier formed on the surface of the hexaboride particle and a Si-containing coating film formed on the pre-coating film.

The component C is preferably nitride particles of at least one metal selected from the group consisting of Ti, Zr, Hf, V, Nb and Ta.

The resin composition of the present invention preferably contains 0.01 to 2 parts by weight of a partial ester of a higher fatty acid and a polyhydric alcohol (component D) based on 100 parts by weight of the component A. The component D is preferably an ester of an aliphatic saturated monocarboxylic acid having 10 to 30 carbon atoms and a polyhydric alcohol.

The resin composition of the present invention preferably contains 0.005 to 5 parts by weight of an ultraviolet absorber (component E) based on 100 parts by weight of the component A. The component E is preferably a hydroxyphenyltriazine-based compound.

The resin composition of the present invention has a total content of the residual chlorine of preferably 100 ppm or less in terms of chlorine atom.

The present invention includes a molded article of the above resin composition. The molded article is preferably a sheet having a thickness of 2 to 50 mm. The molded article is preferably a window member for vehicles.

The present invention also includes a method of manufacturing a resin composition, comprising the step of melt kneading particles which contain 100 parts by weight of coated hexaboride particles, each composed of a hexaboride particle of at least one element selected from the group consisting of Y, La, Ce, Pr, Nd, Sm, Eu, Gd, Tb, Dy, Ho, Er, Tm, Yb, Lu, Sr and Ca and a coating layer (component B), 0.2 to 1000 parts by weight of nitride particles (component C) and 10 to 200 parts by weight of a polymer dispersant (component F) with a polycarbonate resin (component A).

BRIEF DESCRIPTION OF THE DRAWINGS

FIG. 1 (1-A) is a front view of a molded article manufactured in Example and FIG. (1-B) is a side view of the molded article (broken lines show a test piece cut-out portion).

EXPLANATION OF REFERENCE NUMERALS 1 molded article body
2 test piece cut-out portion
3 gate portion of molded article
4 projection of resin filled portion
5 axis of symmetry

DETAILED DESCRIPTION OF THE PREFERRED EMBODIMENTS

The present invention will be described in more detail hereinunder.
(Component A: Polycarbonate Resin)

The polycarbonate resin used as the component A in the present invention is obtained by reacting a diphenol with a carbonate precursor. Examples of the reaction include interfacial polymerization, melt ester interchange, the solid-phase ester interchange of a carbonate prepolymer and the ring opening polymerization of a cyclic carbonate compound.

Typical examples of the diphenol used herein include hydroquinone, resorcinol, 4,4'-biphenol, 1,1-bis(4-hydroxyphenyl)ethane, 2,2-bis(4-hydroxyphenyl)propane (commonly known as bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Out of these, bis(4-hydroxyphenyl)alkanes are preferred diphenol, and bisphenol A (may be abbreviated as "BPA" hereinafter) is particularly preferred from the viewpoint of impact resistance and commonly used.

In the present invention, special polycarbonates manufactured by using other diphenols may be used as the component A, besides bisphenol A-based polycarbonates which are general-purpose polycarbonates.

For example, polycarbonates (homopolymers or copolymers) obtained from 4,4'-(m-phenylenediisopropylidene)diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene and 9,9-bis(4-hydroxy-3-methylphenyl)fluorene (may be abbreviated as "BCF" hereinafter) as part or all of the diphenol component are suitable for use in fields in which the requirements for stability to dimensional change by water absorption and form stability are very strict. These diphenols other than BPA are used in an amount of preferably 5 mol % or more, particularly preferably 10 mol % or more of the whole diphenol component constituting the polycarbonate.

Particularly when high stiffness and excellent hydrolysis resistance are required, the component A constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the diphenol component constituting the polycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the diphenol component constituting the polycarbonate.

(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the diphenol component constituting the polycarbonate.

These special polycarbonates may be used alone or in combination of two or more appropriately. Or, they may be mixed with a commonly used bisphenol A type polycarbonate before use.

The manufacturing processes and characteristics properties of these special polycarbonates are described in detail, for example, in JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions have high hydrolysis resistance and excellent resistance to warping after molding and are therefore particularly suitable for use in fields in which form stability is required.

(i) a polycarbonate having a water absorption coefficient of 0.05 to 0.15%, preferably 0.06 to 0.13% and a Tg of 120 to 180° C., or (ii) a polycarbonate having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture content of a disk-like specimen having a diameter of 45 mm and a thickness of 3.0 mm after the specimen is immersed in water at 23° C. for 24 hours in accordance with ISO62-1980. Tg (glass transition temperature) is a value measured with a differential scanning calorimeter (DSC) in accordance with JIS K7121.

The carbonate precursor is a carbonyl halide, carbonic acid diester or haloformate, as exemplified by phosgene, diphenyl carbonate and dihaloformates of a diphenol.

For the manufacture of a polycarbonate resin from a diphenol and a carbonate precursor by interfacial polymerization, a catalyst, a terminal capping agent and an antioxidant for preventing the oxidation of the diphenol may be optionally used. The polycarbonate resin may be a branched polycarbonate resin obtained by copolymerizing a polyfunctional compound having 3 or more functional groups, a polyester carbonate resin obtained by copolymerizing an aromatic or aliphatic (including alicyclic) dicarboxylic acid, a copolycarbonate resin obtained by copolymerizing a dihydric alcohol (including an alicyclic alcohol), or a polyester carbonate resin obtained by copolymerizing the dicarboxylic acid and the dihydric alcohol. It may also be a mixture of two or more obtained polycarbonate resins.

The branched polycarbonate resin can further improve the dripping preventing ability of the polycarbonate resin composition of the present invention synergistically, therefore the use of it is preferred. Examples of the polyfunctional aromatic compound having 3 or more functional groups used in the branched polycarbonate resin include phloroglucin, phloroglucide, trisphenols such as 4,6-dimethyl-2,4,6-tris(4-hydroxyphenyl)heptane-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The polyfunctional compound in the branched polycarbonate resin accounts for 0.001 to 1 mol %, preferably 0.005 to 0.9 mol %, more preferably 0.01 to 0.8 mol %, particularly preferably 0.05 to 0.4 mol % of the total amount of the polycarbonate resin. Particularly in the case of melt ester interchange, a branched structure may be produced as a by-product. The amount of this branched structure is preferably within the above range based on the total amount of the polycarbonate resin. The amount of the branched structure can be calculated by $^1$H-NMR measurement.

The aliphatic dicarboxylic acid is preferably α,ω-dicarboxylic acid. Preferred examples of the aliphatic dicarboxylic acid include linear saturated aliphatic dicarboxylic acids such as sebacic acid (decanedioic acid), dodecanedioic acid, tetradecanedioic acid, octadecanedioic acid and icosanedioic acid; and alicyclic dicarboxylic acids such as cyclohexanedicarboxylic acid. The dihydric alcohol is preferably an alicyclic diol such as cyclohexane dimethanol, cyclohexane diol or tricyclodecane dimethanol. Further, a copolymer of a polycarbonate and a polyorganosiloxane obtained by copolymerizing a polyorganosiloxane unit may also be used.

Reactions such as interfacial polymerization, melt ester interchange, the solid-phase ester interchange of a carbonate prepolymer and the ring opening polymerization of a cyclic carbonate compound for the manufacture of the polycarbonate resin are well known by various documents and patent publications. Details of reactions other than the above are also well known by written documents and patent publications.

The viscosity average molecular weight of the polycarbonate resin (M) is preferably $1 \times 10^4$ to $5 \times 10^4$, more preferably $1.4 \times 10^4$ to $3 \times 10^4$, much more preferably $1.4 \times 10^4$ to $2.4 \times 10^4$. Since a polycarbonate resin having a viscosity average molecular weight lower than $1 \times 10^4$ may not have impact resistance which is expected for practical use and does not have satisfactory dripping preventing ability, it is apt to be inferior in flame retardancy. Meanwhile, a resin composition obtained from a polycarbonate resin having a viscosity average molecular weight higher than $5 \times 10^4$ is inferior in fluidity at the time of injection molding. Therefore, it has low general applicability.

The viscosity average molecular weight is calculated based on the following equation from a specific viscosity ($\eta_{sp}$) which is obtained from a solution prepared by dissolving 0.7 g of a polycarbonate in 100 ml of methylene chloride at 20° C. with an Ostwald viscometer based on the following equation.

Specific viscosity $(\eta_{sp}) = (t - t_0)/t_0$

[$t_0$ is a time (seconds) required for the dropping of methylene chloride and t is a time (seconds) required for the dropping of a sample solution]

The viscosity average molecular weight M is calculated from the following equation by using obtained $(\eta_{sp})$ $\eta_{sp}/c = [\eta] + 0.45 \times [\eta]^2 c$ ([$\eta$] represents an intrinsic viscosity)

$$[\eta] = 1.23 \times 10^{-4} M^{0.83}$$

$$c = 0.7$$

The method of calculating the viscosity average molecular weight is used for the measurement of the viscosity average molecular weight of the resin composition and molded article of the present invention. That is, the viscosity average molecular weight in the present invention is obtained by inserting a specific viscosity $(\eta_{sp})$ obtained from a solution prepared by dissolving 0.7 g of the molded article in 100 ml of methylene chloride at 20° C. into the above equation.

Although the form of the polycarbonate resin is not particularly limited, a polycarbonate resin powder is preferred because it improves the dispersibility in the polycarbonate resin of hexaboride particles and nitride particles. Further, the particle size distribution of the polycarbonate resin powders is not particularly limited but the content of powders having a particle diameter of 710 μm or more is 50 wt % or less, preferably 40 wt % or less of the total of the powders, and the content of powders having a particle diameter smaller than 180 μm is 0 to 40 wt %, preferably 10 to 30 wt % of the total of the powders.

In the case of polycarbonate resin powders having a content of powders having a particle diameter of 710 μm or more of more than 50 wt % of the total of the powders, the separation of the polycarbonate resin powders from the hexaboride particles and the nitride particles is apt to occur in the manufacturing process of the resin composition of the present invention, whereby the secondary agglomeration of the hexaboride particles and the nitride particles contained in the resin composition readily occurs. As a result, a molded product obtained from the resin composition of the present invention may not exhibit high transparency and heat ray absorptivity according to the amount of the hexaboride particles and the amount of the nitride particles.

In the case of polycarbonate resin powders having a content of powders having a particle diameter smaller than 180 μm of more than 40 wt % of the total of the powders, a failure of biting into the screws of a melt kneader is apt to occur in the manufacturing process of the resin composition of the present invention, thereby reducing productivity.

As for the particle size distribution of the polycarbonate resin powders in the present invention, 200 g of the polycarbonate resin powders is put into a stainless steel JIS standard sieve (22 mesh, opening size of 710 μm), covered and moved back and forth 100 times (one round trip distance of 40 cm, one round trip time of 1 sec), and the mass of powders remaining on the standard sieve is measured to calculate the ratio of the mass of the residual powders to the total mass of the powders as the content of powders having a particle diameter of 710 μm or more. Then, powders falling through the 22-mesh standard sieve are put into a JIS standard sieve (83 mesh, opening size of 180 μm), covered and moved back and forth 100 times, and the mass of powders remaining on the standard sieve is measured to calculate the ratio of the mass of the residual powders to the total mass of the powders as the content of powders having a particle diameter of 180 or more and less than 710 μm. Finally, the mass of powders falling through the 83-mesh standard sieve is measured to calculate the ratio of the mass of the falling powders to the total mass of the powders as the content of powders having a particle diameter smaller than 180 µm.

(Component B: Coated Hexaboride Particles)

Each of the coated hexaboride particles is composed of a hexaboride particle of at least one element selected from the group consisting of Y (yttrium), La (lanthanum), Ce (cerium), Pr (praseodymium), Nd (neodymium), Sm (samarium), Eu (europium), Gd (gadolinium), Tb (terbium), Dy (dysprosium), Ho (holmium), Er (erbium), Tm (thulium), Yb (ytterbium), Lu (lutetium), Sr (strontium) and Ca (calcium) and a coating layer.

Out of the elements constituting the hexaboride particles, La, Ce, Nd and Gd are preferred, and La and Ce are more preferred. The hexaboride is particularly preferably La hexaboride. The hexaboride particles have a particle diameter of preferably 2 to 100 nm, particularly preferably 5 to 90 nm. As a metal boride which is a raw material for the hexaboride particles, the KHDS-06 of Sumitomo Metal Mining Co., Ltd. is commercially available and can be easily acquired.

The coating layer is preferably made from a metal oxide. Preferably, the coating layer contains an oxide of at least one metal selected from the group consisting of Si (silicon), Ti (titanium), Al (aluminum) and Zr (zirconium). As for the ratio of the coating layer to the hexaboride, the amount of a metal contained in the coating layer is preferably 0.01 to 100 parts by weight, more preferably 0.1 to 10 parts by weight based on 1 part by weight of the hexaboride fine particles.

More preferably, the coating layer contains Si (silicon) oxide. As for the ratio of the silicon oxide to the hexaboride, the amount of a silicate compound is generally 0.01 to 100 parts by weight, preferably 0.1 to 10 parts by weight in terms of silicon based on 1 part by weight of the hexaboride fine particles. When the amount of this silicate compound is smaller than 0.01 part by weight, the formation of a secondary coating film is difficult and when the amount is larger than 100 parts by weight, the agglomeration of the particles occurs.

The thickness of the coating layer is preferably 1 to 100 nm, more preferably 5 to 90 nm, much more preferably 10 to 80 nm.

The coating layer can be formed by dispersing hexaboride particles in a solvent and adding and mixing a surface treating agent containing a metal oxide with the solvent to chemically or physically coat the hexaboride particles with the surface treating agent.

Examples of the surface treating agent include silazane-based treating agents, chlorosilane-based treating agents, inorganic treating agents having an alkoxy group in the molecular structure, organic treating agents having an amino group-containing alkoxysilane which are expected to improve water repellency at a terminal or side chain of the molecule, and organic treating agents having an alkoxy group at a terminal or side chain of the molecule. The solvent in use is water, an organic solvent such as alcohol, or a mixture of water and an organic solvent.

The preferred coated hexaboride is prepared by coating the surface of a lanthanum hexaboride or cerium hexaboride particle with a silicon oxide coating layer.

The coating layer preferably consists of a pre-coating film of a surface modifier formed on the surface of a hexaboride particle and a coating film essentially composed of Si oxide formed on the pre-coating film. That is, it is preferred that the pre-coating film should be formed from a surface modifier such as a silane coupling agent on the surface of the hexaboride particle and then the coating film essentially composed of Si oxide should be formed on the pre-coating film.

In the present invention, the average particle diameter of the coated hexaboride particles is preferably 2 to 100 nm, more preferably 5 to 90 nm, much more preferably 10 to 80 nm. When the average particle diameter is larger than 100 nm, the absorption properties of near infrared radiation close to the visible range deteriorate. That is, the coated hexaboride particles cannot have a profile that their transmittance has a maximum value at a wavelength of 400 to 700 nm and a minimum value at a wavelength of 700 to 1,800 nm and the difference between the maximum value and the minimum value is 15 points or more in percentage. As a result, the coating layer becomes a monotonous grayish film having reduced transmittance. The average particle diameter is calculated by analyzing an image obtained by electron microscopic observation to calculate the area of each primary particle, obtaining the diameter of a circle having the above area and weight averaging the diameters. The calculation is made by obtaining the reduced diameters of 500 or more particles.

The reduced diameter of each coated hexaboride particle is preferably 380 nm or less, more preferably 150 nm or less. The reduced diameter of each coated hexaboride particle is existent in the range from preferably ±50%, more preferably ±30% of the average particle diameter to the average diameter.

The content of the coated hexaboride particles is 0.0001 to 0.05 part by weight, preferably 0.001 to 0.03 part by weight, more preferably 0.001 to 0.01 part by weight based on 100 parts by weight of the polycarbonate resin (component A).

(Component C: Nitride Particles)

The resin composition of the present invention contains nitride particles (component C) to control its color.

The nitride particles (component C) are preferably nitride particles of at least one metal selected from the group consisting of Ti, Zr, Hf, V, Nb and Ta.

Examples of the nitride particles (component C) are titanium nitride (TiN), zirconium nitride (ZrN), hafnium nitride (HfN), vanadium nitride (VN), niobium nitride (NbN) and tantalum nitride (TaN) particles, all of which are disclosed by JP-A 2001-49190 and JP-A 2001-179121.

The average particle diameter of the nitride particles is preferably 2 to 100 nm, more preferably 5 to 90 nm, much more preferably 10 to 80 nm. When the average particle diameter is smaller than 100 nm, the scattering of light having a visible range of 400 to 780 nm by the particles is reduced, whereby transparency required for window materials can be retained. When the average particle diameter is 2 nm or more, the industrial-scale manufacture of the nitride particles is easy.

The content of the nitride particles (component C) is 0.0001 to 0.05 part by weight, preferably 0.0002 to 0.02 part by weight, more preferably 0.0002 to 0.005 part by weight based on 100 parts by weight of the polycarbonate resin (component A). When the content is lower than 0.0001 part by weight, the effect of controlling color is small and when the content is higher than 0.05 part by weight, a reduction in the transmittance of the visible range is marked, whereby transparency required for window materials is impaired.

The present invention is characterized by using nitride particles (component C) as a color control agent. When the component C is contained, the color of the polycarbonate resin which readily turns yellow can be maintained. The component C is an inorganic color control agent and superior in moist heat resistance to an organic color control agent which is easily affected by temperature.

(Component D: Partial Ester of Higher Fatty Acid and Polyhydric Alcohol)

The resin composition of the present invention preferably contains an ester of a higher fatty acid and a polyhydric alcohol (component D) to suppress the decomposition of the hexaboride particles. The component D is an ester of an aliphatic saturated monocarboxylic acid and a polyhydric alcohol. The aliphatic saturated monocarboxylic acid is a carboxylic acid having preferably 10 to 30 carbon atoms, more preferably 10 to 22 carbon atoms. Examples of the aliphatic saturated monocarboxylic acid include capric acid, lauric acid, myristic acid, palmitic acid, stearic acid, arachidic acid and behenic acid. Examples of the polyhydric alcohol include ethylene glycol, glycerin and pentaerythritol.

The component D is preferably a partial ester of an aliphatic saturated monocarboxylic acid and a polyhydric alcohol. The partial ester is an ester in which some of the hydroxyl groups of the polyhydric alcohol used for the synthesis of an ester are esterified. It is preferably a partial ester of stearic acid and glycerin which is commercially available under the trade name of Rikemal S-100A from Riken Vitamin Co., Ltd. and can be easily acquired from the market.

The content of the ester (component D) is preferably 0.01 to 2 parts by weight, more preferably 0.02 to 1 part by weight, much more preferably 0.02 to 0.5 part by weight based on 100 parts by weight of the polycarbonate resin (component A). When the content is lower than 0.01 part by weight, the effect of suppressing the decomposition of the hexaboride particles is small and when the content is higher than 2 parts by weight, the molecular weight of the polycarbonate resin is reduced and mechanical properties inherent to the resin composition cannot be exhibited.

(Component E: Ultraviolet Absorber)

The resin composition of the present invention preferably contains an ultraviolet absorber (component E) The content of the ultraviolet absorber is preferably 0.005 to 5 parts by weight, more preferably 0.01 to 3 parts by weight, much more preferably 0.05 to 0.5 part by weight based on 100 parts by weight of the polycarbonate resin (component A).

The ultraviolet absorber is, for example, a benzophenone-based compound which are well known as an ultraviolet absorber, benzotriazole-based compound, hydroxyphenyltriazine-based compound, cyclic iminoester-based compound or cyanoacrylate-based compound.

Preferred examples of the benzotriazole-based compound include 2-(2H-benzotriazol-2-yl)-p-cresol, 2-(2H-benzotriazol-2-yl)-4-(1,1,3,3-tetramethylbutyl)phenol, 2-(2H-benzotriazol-2-yl)-4,6-bis(1-methyl-1-phenylethyl)phenol, 2-[5-chloro(2H)-benzotriazol-2-yl]-4-methyl-6-tert-butyl phenol and 2,2'-methylenebis[6-(2H-benzotriazol-2-yl)-4-(1,1,3,3-tetramethylbutyl)phenol].

Preferred examples of the hydroxyphenyltriazine-based compound include 2-(4,6-diphenyl-1,3-5-triazin-2-yl)-5-[(hexyl)oxy]phenol.

Preferred examples of the cyclic iminoester-based compound include 2,2'-p-phenylenebis(3,1-benzoxazin-4-one). Preferred examples of the cyanoacrylate-based compound include 1,3-bis[(2-cyano-3,3-diphenylacryloyl)oxy]-2,2-bis[[(2-cyano-3,3-diphenylacryloyl)oxy]methyl]propane.

Further, the ultraviolet absorber may be a polymer type ultraviolet absorber obtained by copolymerizing an ultraviolet light absorbing monomer having a radically polymerizable monomer compound structure and a monomer such as an alkyl(meth)acrylate. The above ultraviolet light absorbing monomer is preferably a compound having a benzotriazole skeleton, benzophenone skeleton, triazine skeleton, cyclic iminoester skeleton or cyanoacrylate skeleton in the ester substituent of a (meth)acrylate.

Out of the above compounds, cyclic iminoester-based compounds are preferred as the ultraviolet absorber because they have excellent heat stability. Other compounds having a relatively high molecular weight are also preferred as they have excellent heat resistance, as exemplified by 2,2'-methylenebis[6-(2H-benzotriazol-2-yl)-4-(1,1,3,3-tetramethylbutyl)phenol], 2-(4,6-diphenyl-1,3,5-triazin-2-yl)-5-[(hexyl)oxy]phenol and 1,3-bis[(2-cyano-3,3-diphenylacryloyl)oxy]-2,2-bis[[(2-cyano-3,3-diphenylacryloyl)oxy]methyl]propane.

Hydroxyphenyltriazine-based compounds are particularly preferred.

(Component F: Polymer Dispersant)

The resin composition of the present invention preferably contains a polymer dispersant (component F) to disperse the coated hexaboride particles (component B) into the polycarbonate resin (component A) uniformly. The content of the component F is preferably 10 to 200 parts by weight, more preferably 15 to 150 parts by weight, much more preferably 20 to 100 parts by weight based on 100 parts by weight of the coated hexaboride particles (component B).

As the polymer dispersant (component F) may be used a polymer material having a functional group which is adsorbed to the coated hexaboride particles (component B) and serves as an anchor and a polymer main chain with high affinity for an organic solvent or the polycarbonate resin (component A). Examples of the above functional group are, for example, an amino group, carboxyl group, sulfonyl group or salt thereof. It is not particularly limited if it is a functional group having affinity for the coated hexaboride particles. Examples of the polymer dispersant include polyacrylate-based dispersants, polyurethane-based dispersants, polyether-based dispersants, polyester-based dispersants and polyester urethane-based dispersants.

(Other Additives)

The resin composition of the present invention may contain conventionally known additives in limits that its transparency and sunlight blocking ability are not impaired. The additives include a heat stabilizer, antioxidant, optical stabilizer, colorant, release agent, lubricant, infrared light absorber, optical diffuser, fluorescent brightener, antistatic agent, flame retardant, flame retarding aid, plasticizer, reinforcing filler, impact modifier, optical catalyst-based antifouling agent and photochromic agent. The heat stabilizer, antioxidant, optical stabilizer, colorant and release agent may be used in known proper amounts in the polycarbonate resin.

Since the molded article of the present invention is used outdoors as a window material for buildings, housing, automobiles, trains and aircraft as described above, it is preferred that the molded article should contain a heat stabilizer and an antioxidant in particular.

(Heat Stabilizer)

The heat stabilizer is preferably a phosphorus-based stabilizer. The phosphorus-based stabilizer is, for example, phosphorous acid, phosphoric acid, phosphonous acid, phosphonic acid, ester thereof or tertiary phosphine. Specific examples of the phosphite out of the above phosphorus-based stabilizers include trialkyl phosphites such as tris(isodecyl) phosphite, aryl dialkyl phosphites such as phenyl diisodecyl phosphite, diaryl monoalkyl phosphites such as diphenyl mono(isodecyl)phosphite, triaryl phosphites such as tris(2,4-di-tert-butylphenyl)phosphite, pentaerythritol type phosphites such as distearyl pentaerythritol diphosphite, bis(2,4-di-tert-butylphenyl)pentaerythritol diphosphite, bis(2,6-di-tert-butyl-4-methylphenyl)pentaerythritol diphosphite and bis{2, 4-bis(1-methyl-1-phenylethyl)phenyl} pentaerythritol diphosphite, and phosphites having a cyclic structure obtained by reacting with a diphenol, such as 2,2-methylenebis(4,6-di-tert-butylphenyl)octyl phosphite. Preferred examples of the phosphate out of the phosphorus-based stabilizers include trimethyl phosphate and triphenyl phosphate. Preferred examples of the phosphonite compound include tetrakis(2,4-di-tert-butylphenyl)-biphenylene diphosphonite and bis(2,4-di-tert-butylphenyl)-phenyl-phenylphosphonite. Preferred examples of the tertiary phosphine include triphenyl phosphine.

(Antioxidant)

The antioxidant is preferably a hindered phenol compound. Examples of the antioxidant include tetrakis[methylene-3-(3-tert-butyl-4-hydroxy-5-methylphenyl)propionate] methane, octadecyl-3-(3,5-di-tert-butyl-4-hydroxyphenyl) propionate, and 3,9-bis[2-{3-(3-t-butyl-4-hydroxy-5-methylphenyl)propionyloxy}-1,1-dimethylethyl]-2,4,8,10-tetraoxaspiro [5,5]undecane.

Another heat stabilizer is preferably a lactone-based stabilizer typified by a reaction product of 3-hydroxy-5,7-di-tert-butyl-furan-2-one and o-xylene. The stabilizer is described in detail in JP-A 7-233160. The compound is commercially available under the trade name of Irganox HP-136 (trademark, manufactured by Ciba Specialty Chemicals Holding Inc.) and may be used. Further, stabilizers prepared by mixing together the above compound, a phosphite compound and a hindered phenol compound are commercially available. The Irganox HP-2921 of the above company is such a preferred example.

Other heat stabilizers include sulfur-containing stabilizers such as pentaerythritol tetrakis(3-mercaptopropionate), pentaerythritol tetrakis(3-laurylthiopropionate) and glycerol-3-stearylthiopropionate.

The contents of the above heat stabilizer and antioxidant are each 0.0001 to 1 part by weight, preferably 0.01 to 0.3 part by weight based on 100 parts by weight of the polycarbonate resin (component A). The upper limit of the amount of the lactone-based stabilizer is preferably 0.03 part by weight.

(Optical Stabilizer)

The resin composition of the present invention may contain a hindered amine-based optical stabilizer typified by bis(2,2,6,6-teramethyl-4-piperidyl)sebacate. A combination of a hindered amine-based optical stabilizer and an ultraviolet absorber improves weatherability effectively. The weight ratio of the optical stabilizer to the ultraviolet absorber is preferably 95/5 to 5/95, more preferably 80/20 to 20/80. The optical stabilizers may be used alone or in combination of two or more. The content of the optical stabilizer is 0.0005 to 3 parts by weight, more preferably 0.01 to 2 parts by weight, much more preferably 0.05 to 0.5 part by weight based on 100 parts by weight of the polycarbonate resin (component A).

(Amount of Chlorine)

The total amount of the residual chlorine contained in the resin composition of the present invention is preferably 100 ppm or less, more preferably 10 to 60 ppm, much more preferably 20 to 40 ppm in terms of chlorine atom.

To obtain a resin composition having a total chlorine content of less than 10 ppm, a complicated step for treating the polycarbonate resin as the component A with acetone or for removing chlorine by injecting water into a vented extruder forcedly when the polycarbonate resin powders are pelletized is required, thereby reducing the process yield and process stability, which is economically disadvantageous.

In a resin composition having a total chlorine content of more than 100 ppm, the decomposition of hexaboride particles is apt to proceed. The content of chlorine atom is measured by a combustion method (detection sensitivity of about 0.1 ppm) using the TSX-10 chlorine sulfur analyzer of Mitsubishi Chemical Corporation.

(Manufacture of Resin Composition)

The resin composition of the present invention can be manufactured by mixing together the components A, B, C and optional components completely by means of pre-mixing means such as a twin-cylinder mixer, Henschel mixer, mechano-chemical device or extrusion mixer and melt kneading them by means of a melt kneader typified by a vented double-screw extruder. After pre-mixing, granulation may be carried out by means of an extrusion granulator or a briquetting machine. After melt kneading, the obtained product is preferably pelletized by means of a pelletizer or the like. The components B and C may be pre-mixed together.

To supply these components into the melt kneader, (i) the components A, B, C and other components are each independently supplied into the melt kneader, or (ii) the components A, B, C and some of other components are pre-mixed together and then supplied into the melt kneader independently of the rest of the other components. When there is a liquid component to be mixed, a liquid injector or liquid adder may be used to supply it into the melt kneader.

An extruder having a vent from which water contained in the raw material and a volatile gas generated from the molten kneaded resin can be removed is preferably used as the extruder. A vacuum pump is preferably installed to discharge the generated water and volatile gas to the outside of the extruder from the vent efficiently. A screen for removing foreign matter contained in the extruded raw material may be installed in a zone before the dice of the extruder to remove the foreign matter from the resin composition. Examples of the screen include a metal net, screen changer and sintered metal plate (such as a disk filter). Examples of the melt kneader include a Banbury mixer, kneading roll, single-screw extruder and multi-screw extruder having 3 or more screws besides the double-screw extruder.

The resin extruded as described above is pelletized by cutting with a pelletizer directly or after a strand is formed from the resin. When the influence of extraneous dust must be reduced before pelletization, the atmosphere surrounding the extruder is preferably made clean. The shape of the obtained pellet may be an ordinary shape such as columnar, square pillar-like or spherical shape but preferably a columnar shape. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

The resin composition of the present invention can be manufactured by melt kneading particles which contain 100 parts by weight of the coated hexaboride particles (component B), 0.2 to 1,000 parts by weight of the nitride particles (component C) and 10 to 200 parts by weight of the polymer dispersant (component F) with the polycarbonate resin (component A).

The coated hexaboride particles (component B), the nitride particles (component C) and the polymer dispersant (component F) have already been described above.

The content of the nitride particles (component C) is preferably 1 to 500 parts by weight, more preferably 5 to 300 parts by weight, most preferably 5 to 100 parts by weight based on 100 parts by weight of the component B. The content of the polymer dispersant (component F) is preferably 15 to 150 parts by weight, more preferably 20 to 100 parts by weight based on 100 parts by weight of the component B.

The polycarbonate resin (component A) is used in an amount of $2 \times 10^5$ to $1 \times 10^8$ parts by weight, preferably $3.3 \times 10^5$ to $1 \times 10^7$ parts by weight, more preferably $1 \times 10^6$ to $1 \times 10^7$ parts by weight based on 100 parts by weight of the component B.

(Molded Article)

The present invention includes a molded article of the above resin composition.

The molded article of the present invention can be generally obtained by injection molding a pellet of the resin composition. For injection molding, not only ordinary molding techniques but also injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding may be employed. Both cold-runner molding and hot-runner molding techniques may be employed.

According to the present invention, the resin composition can be extrusion molded to obtain a molded article having an irregular shape, sheet or film. For the molding of a sheet or a film, inflation, calendering or casting may be used. Further, the resin composition may be molded into a heat shrinkable tube by carrying out specific stretching operation. The resin composition of the present invention can be formed into a molded article by rotational molding or blow molding. These molding processes are described in detail, for example, in JP-A 2005-179504.

The molded article of the resin composition of the present invention is, for example, a sheet having a thickness of preferably 2 to 50 mm, more preferably 10 to 50 mm, much more preferably 15 to 50 mm, particularly preferably 18 to 50 mm.

The molded article of the present invention is suitable for use as a window member for vehicles.

(Lamination on Molded Article)

The molded article of the present invention may have various functional layers including a hard coat layer on the surface. The functional layers include a pattern layer, a conductive layer (exothermic layer, electromagnetic wave absorbing layer, antistatic layer), water-repellent layer, oil-repellent layer, hydrophilic layer, ultraviolet absorbing layer, infrared absorbing layer, crack prevention layer and metal layer (metallizing layer). These functional layers may be formed on the surface of the hard coat layer, on the surface of the molded article opposite to the hard coat layer, between layers of the molded article which has a plurality of layers, in part of the space between a primer layer and the surface of the molded article, or in part of the space between the primer layer and the top layer of a hard coat.

The pattern layer is generally formed by printing. A conventionally known printing method such as gravure printing, surface printing, flexo printing, dry offset printing, pat printing or screen printing may be used according to the shape of the product and printing purpose.

The manufacturing method and characteristic properties of the hard coat layer are described in detail, for example, in JP-A 2005-179504 and JP-A 2006-255928.

Printing ink used for printing, which comprises a resin or oil as the main component may be used. Examples of the resin include natural resins such as rhodine, gilsonite, shellac and copal, and synthetic resins such as phenols and derivatives thereof, amino-based resin, butylated urea, melamine resin, polyester-based alkyd resins, styrene resin, acrylic resin, phenolic resin, epoxy resin, polyamide resin, polycarbonate resin, saturated polyester resin, noncrystalline polyarylate resin, noncrystalline polyolefin resin, vinyl chloride resin, vinyl acetate resin, vinyl chloride-vinyl acetate copolymer, butyral resin, methylcellulose resin, ethylcellulose resin and urethane resin. When a highly heat resistant ink component is required, printing ink which comprises polycarbonate resin and noncrystalline polyarylate resin as binders is preferably used. A desired color can be obtained by containing a pigment or dye in the printing ink.

EXAMPLES

The following examples are provided to further illustrate the present invention. The total content of the residual chlorine in the resin composition and the obtained molded article were evaluated by the following methods. "Part" in the examples means "parts by weight".

(1) Total Chlorine Content

This was measured by the combustion method (detection sensitivity of about 0.1 ppm) using the TSX10 chlorine sulfur analyzer of Mitsubishi Chemical Corporation.

(2) Total Light Transmittance

The total light transmittance (%) before and after the following moist heat treatment of a test piece having a thickness of 18 mm, a length of 55 mm and a width of 55 mm was measured by the NDH-300A of Nippon Denshoku Industries Co., Ltd.

(3) Direct Solar Absorption/Solar Radiation Heat Acquisition Rate

The direct solar absorption (%) and solar radiation heat acquisition rate before and after the following moist heat treatment of a test piece having a thickness of 18 mm, a length of 55 mm and a width of 55 mm were measured at a wavelength of 300 to 2,100 nm by using a spectrophotometer (U-4100 of Hitachi High-Technologies Corporation) in accordance with "Method of Testing the Transmittance, Reflectance, Emissivity and Solar Radiation Heat Acquisition Rate of Sheet Glasses" of JIS R3106 (1998).

(4) Moist Heat Treatment

A test piece having a thickness of 18 mm, a length of 55 mm and a width of 55 mm was exposed to a 120° C. and 75% RH atmosphere for 40 hours by using a pressure coocker tester.

(5) Change in Appearance

The change in appearance of a test piece after the moist heat treatment was checked visually.

(6) Particle Size Distribution of Polycarbonate Resin Powders 200 g of the polycarbonate resin powders was put into a stainless steel JIS standard sieve (22 mesh, opening size of 710 μm), covered and moved back and forth 100 times (one round trip distance of 40 cm, one round trip time of 1 sec), and the mass of powders remaining on the standard sieve was measured to calculate the ratio of the mass of the residual powders to the total mass of the powders as the content of powders having a particle diameter of 710 μm or more. Then, powders falling through the 22-mesh standard sieve were put into a stainless steel JIS standard sieve (83 mesh, opening size of 180 μm), covered and moved back and forth 100 times, and the mass of powders remaining on the standard sieve was measured to calculate the ratio of the mass of the residual powders to the total mass of the powders as the content of powders having a particle diameter of 180 or more and less than 710 μm. Finally, the mass of powders falling through the 83-mesh standard sieve was measured to calculate the ratio of the mass of the falling powders to the total mass of the powders as the content of powders having a particle diameter smaller than 180 μm.

(7) CIELab

As for the color before and after the moist heat treatment of a test piece having a thickness of 18 mm, a length of 55 mm and a width of 55 mm, the L* value (brightness), a* value (reddish to greenish color) and b* value (yellowish to bluish color) of the test piece under the D65 light source (correlated color temperature of 6,504 K) were measured by using a spectrophotometer (Color-Eye 7000A of GretagMacbeth AG) in accordance with JIS Z8729.

Reference Example 1

Preparation of Coated Lanthanum Hexaboride Particles 8 parts by weight of lanthanum hexaboride particles having an average particle diameter of 80 nm (KHDS-06 of Sumitomo Metal Mining Co., Ltd.) was mixed with 0.5 part by weight of γ-aminopropyltriethoxysilane as a silane coupling agent and 392 parts by weight of water under agitation to adsorb γ-aminopropyltriethoxysilane to the surface of each lanthanum hexaboride particle for surface modification. Then, water was removed by a centrifugal separator, and 45 parts by weight of tetraethoxysilane was added to the surface modified lanthanum hexaboride particles and a mixed solvent of 280 parts by weight of ethanol and 70 parts by weight of water to form a silica coating film on the surface of each lanthanum hexaboride particle by hydrolytic polymerization. Thereafter, alcohol and water were removed by a centrifugal separator, and the particles were dried and heated at 450° C. for 30 minutes to obtain coated lanthanum hexaboride particles. The weight ratio of (a) lanthanum hexaboride to (b) the coating layer in the coated lanthanum hexaboride particle was (a)/(b)=40/60.

Reference Example 2

Preparation of a Mixture of Coated Lanthanum Hexaboride Particles and Titanium Nitride Particles 20 parts by weight of the coated lanthanum hexaboride particles obtained in Reference Example 1, 75 parts by weight of toluene and 5 parts by weight of an acrylic resin-based dispersant (EFKA-4530 of EFKA Additives B.V.) were mixed and dispersed together to obtain a dispersion of coated lanthanum hexaboride particles (liquid (i)).

Meanwhile, 20 parts by weight of titanium nitride particles having an average particle diameter of 80 nm (manufactured by Sumitomo Metal Mining Co., Ltd.), 75 parts by weight of toluene and 5 parts by weight of an acrylic resin-based dispersant (EFKA-4530 of EFKA Additives B.V.) were mixed and dispersed together to obtain a dispersion of titanium nitride particles (liquid (ii)) so as to control the color.

Then, the liquids (i) and (ii) were mixed together to ensure that the weight ratio of lanthanum hexaboride contained in the coated lanthanum hexaboride particles to the titanium nitride particles became 9:1, 8:2, 7:3 and 5:5 (weight ratio of the coated lanthanum hexaboride particles to the titanium nitride particles was 23:1, 20:2, 18:3 and 13:5). Thereafter, toluene was removed by a centrifugal separator, and the resulting mixtures were dried to obtain four different mixtures of coated lanthanum hexaboride particles and titanium nitride particles in different weight ratios.

Reference Example 3

Preparation of a Mixture of Lanthanum Hexaboride Particles and Titanium Nitride Particles 20 parts by weight of lanthanum hexaboride particles having an average particle diameter of 80 nm (KHDS-06 of Sumitomo Metal Mining Co., Ltd.), 75 parts by weight of toluene and 5 parts by weight of an acrylic resin-based dispersant (EFKA-4530 of EFKA Additives B.V.) were mixed and dispersed together to obtain a dispersion of lanthanum hexaboride particles (liquid (iii)).

20 parts by weight of titanium nitride particles having an average particle diameter of 80 nm (manufactured by Sumitomo Metal Mining Co., Ltd.), 75 parts by weight of toluene and 5 parts by weight of an polymer dispersant were mixed and dispersed together in the same manner as in Reference Example 2 to obtain a dispersion of titanium nitride particles (liquid (ii)) so as to control the color.

Then, the liquids (iii) and (ii) were mixed together to ensure that the weight ratio of the lanthanum hexaboride particles to the titanium nitride particles became 8:2. Thereafter, toluene was removed by a centrifugal separator, and the resulting mixture was dried to obtain a mixture of lanthanum hexaboride particles and titanium nitride particles.

Reference Example 4

Preparation of a Mixture of Coated Lanthanum Hexaboride Particles and a Polymer Dispersant Toluene was removed from the liquid (i) in Reference Example 2 by a centrifugal separator, and the obtained liquid was dried to obtain coated lanthanum hexaboride particles (mixture with an acrylic resin-based dispersant).

Example 1

A resin molded test piece was manufactured through the following processes (I) and (II).
(I) Manufacture of Resin Raw Material 9.57 parts by weight of PC, 0.0030 part by weight of the mixture prepared in Reference Example 2 [the total amount of lanthanum hexaboride contained in the coated lanthanum hexaboride particles and titanium nitride particles was 0.001 part by weight, lanthanum hexaboride particles: titanium nitride particles=9:1 (weight ratio), coated lanthanum hexaboride particles: titanium nitride particles=23:1 (weight ratio)], 0.02 part by weight of S100A, 0.03 part by weight of IRGF, 0.10 part by weight of EW and 0.30 part by weight of UV79 were uniformly mixed together by a super mixer. 10 parts by weight of the obtained mixture and 90 parts by weight of PC were uniformly mixed together by a twin-cylinder mixer to obtain a pre-mixture to be supplied into an extruder.

The obtained pre-mixture was supplied into the extruder. The extruder in use was a vented double-screw extruder having a screw diameter of 77 mm (TEX77CHT (completely mated, unidirectional rotation, two screws) of The Japan Steel Works, Ltd.). The extruder had a kneading zone provided with a combination of a forward feed kneading disk and a back feed kneading disk in a portion having an L/D of about 8 to 11 from the root of the screw and a kneading zone provided with a feed kneading disk in a portion having an L/D of about 16 to 17. Further, the extruder had a back feed full-flight zone with an L/D of 0.5 right after the latter kneading zone. One vent port was formed in a portion having an L/D of about 18.5 to 20. Extrusion conditions included a discharge rate of 320 kg/h, a screw revolution of 160 rpm and a vent vacuum degree of 3 kPa. The extrusion temperature was gradually raised from 230° C. at a first feed port to 280° C. at a dice portion.

A strand extruded from a dice was cooled in a hot water bath and cut by a pelletizer to obtain a pellet. When the pellet right after cutting passed through a vibration type sieve in 10 seconds, a long pellet which was not completely cut and a cut chip which could be removed were removed.

(II) Preparation of a Test Piece of a Resin Molded Plate

Figure 1:
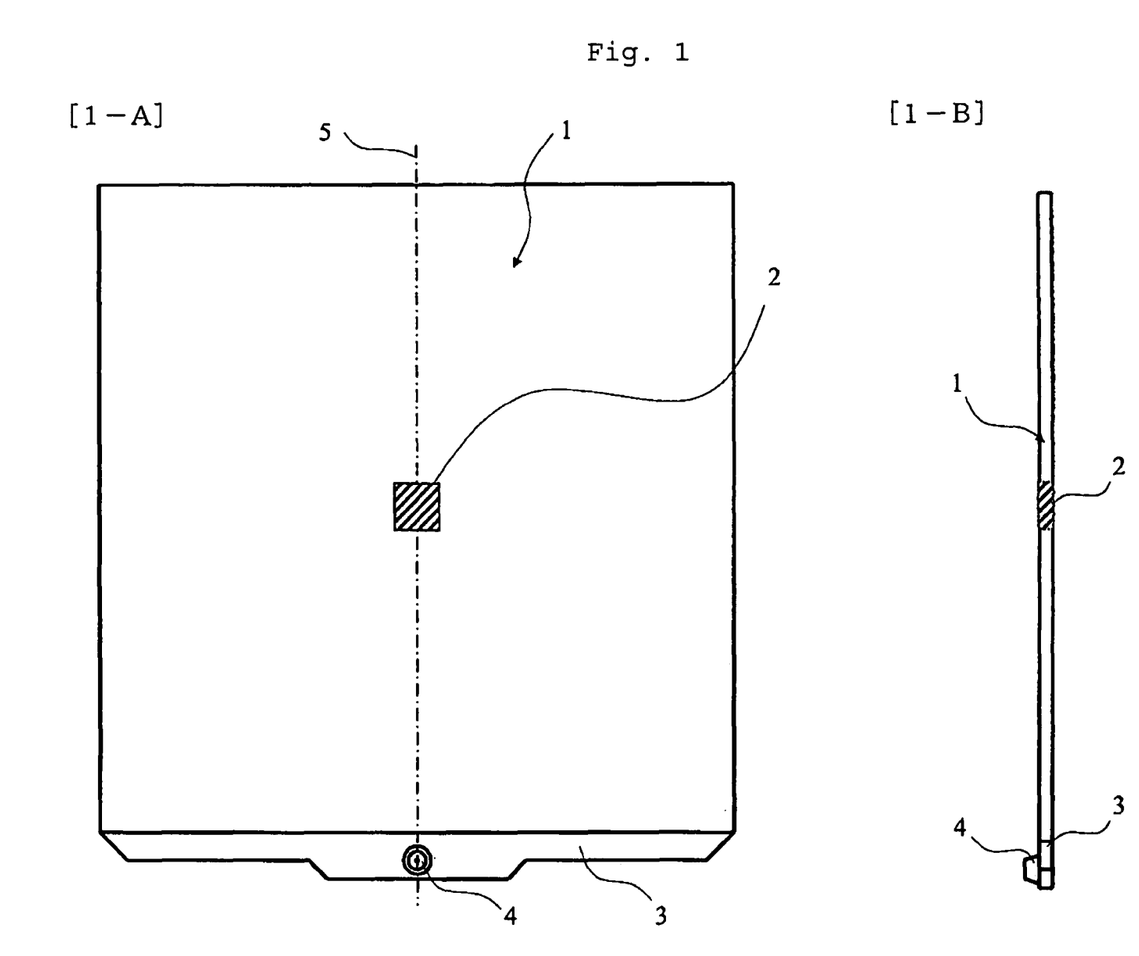

The pellet as the resin raw material manufactured by the above method (I) was injection press molded by using a large-size molding machine capable of injection press molding and having a four-axis parallel control mechanism for a platen (MDIP2100 of Meiki Co., Ltd., maximum clamping force of 33,540 kN) to manufacture a molded article having a thickness of 18 mm, a length of 700 mm and a width of 800 mm shown in FIG. 1. The molding machine is provided with a hopper drier capable of drying the resin raw material completely and was used to mold the pellet after drying which was supplied into the feed port of the molding machine pneumatically.

Molding was carried out at a cylinder temperature of 275° C., a hot runner set temperature of 275° C., a metal mold temperature of 115° C. on the fixed side and 120° C. on the movable side, a press stroke of 0.5 mm, a metal mold moving speed from the intermediate clamped state to the final clamped state of 0.02 mm/sec and a pressure holding time of 600 sec. The pressure at the time of compression was 25 MPa, and this pressure was maintained for the pressure holding time. The injection speed was 5 mm/sec before filling into the gate portion and 16 mm/sec in an area after that. The parting face of the metal mold on the movable side did not contact the parting face of the metal mold on the fixed side at the final advance position. A valve gate type hot runner (diameter of 8 mm) of HOTSYS Co., Ltd. was used. Mold compression was started right before the end of filling and the overlap time was set to 0.5 sec. The valve gate was closed right after the end of filling to prevent the backward flow of a molten resin from the gate into the cylinder. During molding, tan θ which indicates the amount of inclination and the amount of twist was maintained at about 0.000025 or less by the four-axis parallel control mechanism.

The obtained molded article was taken out and left for 60 minutes to be fully cooled. The molded plate was highly transparent and green. A central portion having a length of 55 mm and a width of 55 mm of the molded plate shown by the diagonal lines in FIG. 1 was cut out to obtain a test piece.

The evaluation results of the total amount of the residual chlorine in the pellet manufactured by the method (I) and the test piece obtained by the method (II) are shown in Table 1.

Example 2

In the above (I), 9.55 parts by weight of PC, 0.0028 part by weight of the mixture prepared in Reference Example 2 [the total amount of lanthanum hexaboride contained in the coated lanthanum hexaboride particles and titanium nitride particles was 0.001 part by weight, lanthanum hexaboride particles: titanium nitride particles=8:2 (weight ratio), coated lanthanum hexaboride particles: titanium nitride particles=20:2 (weight ratio)], 0.02 part by weight of S100A, 0.03 part by weight of PEPQ, 0.10 part by weight of VPG and 0.30 part by weight of UV1577 were mixed together. A resin raw material was manufactured in the same manner as in Example 1 except that 10 parts by weight of the obtained mixture and 90 parts by weight of PC were uniformly mixed together by a twin-cylinder mixer. Thereafter, molding was carried out in the same manner as in Example 1 to form a test piece of a resin plate. The evaluation results of the total amount of the residual chlorine in the manufactured pellet and the obtained test piece are shown in Table 1.

Example 3

In the above (I), 9.57 parts by weight of PC, 0.0026 part by weight of the mixture prepared in Reference Example 2 [the total amount of lanthanum hexaboride contained in the coated lanthanum hexaboride particles and titanium nitride particles was 0.001 part by weight, lanthanum hexaboride particles: titanium nitride particles=7:3 (weight ratio), coated lanthanum hexaboride particles: titanium nitride particles=18:3 (weight ratio)], 0.03 part by weight of IRGF, 0.10 part by weight of EW and 0.30 part by weight of UV79 were uniformly mixed together by a super mixer. A resin raw material was manufactured in the same manner as in Example 1 except that 10 parts by weight of the obtained mixture and 90 parts by weight of PC were uniformly mixed together by a twin-cylinder mixer. Thereafter, molding was carried out in the same manner as in Example 1 to form a test piece of a resin plate. The evaluation results of the total amount of the residual chlorine in the manufactured pellet and the obtained test piece are shown in Table 1.

Example 4

To manufacture polycarbonate resin powders having a viscosity average molecular weight of 23,700 from bisphenol A and phosgene by interfacial polycondensation, polycarbonate resin powder PC (i) having a total content of the residual chlorine of 190 ppm was prepared by shortening the drying time.

In the above (I), 9.07 parts by weight of PC(i), 0.0044 part by weight of the mixture prepared in Reference Example 2 [the total amount of lanthanum hexaboride contained in the coated lanthanum hexaboride particles and titanium nitride particles was 0.002 part by weight, lanthanum hexaboride particles: titanium nitride particles=5:5 (weight ratio), coated lanthanum hexaboride particles: titanium nitride particles=13:5 (weight ratio)], 0.5 part by weight of S100A, 0.03 part by weight of PEPQ, 0.10 part by weight of VPG and 0.30 part by weight of UV1577 were uniformly mixed together by a super mixer. A resin raw material was manufactured in the same manner as in Example 1 except that 10 parts by weight of the obtained mixture and 90 parts by weight of PC (i) were uniformly mixed together by a twin-cylinder mixer. Thereafter, molding was carried out in the same manner as in Example 1 to form a test piece of a resin plate. The evaluation results of the total content of the residual chlorine in the manufactured pellet and the obtained test piece are shown in Table 1.

Example 5

In the above (I), 9.57 parts by weight of PC, 0.0030 part by weight of the mixture prepared in Reference Example 2 [the total amount of lanthanum hexaboride contained in the coated lanthanum hexaboride particles and titanium nitride particles was 0.0011 part by weight, lanthanum hexaboride particles: titanium nitride particles=8:2 (weight ratio) coated lanthanum hexaboride particles: titanium nitride particles=20:2 (weight ratio)], 0.03 part by weight of PEPQ, 0.10 part by weight of VPG and 0.30 part by weight of UV1577 were uniformly mixed together by a super mixer. A resin raw material was manufactured in the same manner as in Example 1 except that 10 parts by weight of the obtained mixture and 90 parts by weight of PC were uniformly mixed together by a twin-cylinder mixer. Thereafter, molding was carried out in the same manner as in Example 1 to form a test piece of a resin plate. The evaluation results of the total content of the residual chlorine in the manufactured pellet and the obtained test piece are shown in Table 1.

Comparative Example 1

9.55 parts by weight of PC, 0.0031 part by weight of the coated lanthanum hexaboride particles prepared in Reference Example 4 (the amount of lanthanum hexaboride contained in the coated lanthanum hexaboride particles was 0.001 part by weight), 0.02 part by weight of S100A, 0.03 part by weight of PEPQ, 0.10 part by weight of VPG and 0.30 part by weight of UV1577 were uniformly mixed together by a super mixer. A resin raw material was manufactured in the same manner as in Example 1 except that 10 parts by weight of the obtained mixture and 90 parts by weight of PC were uniformly mixed together by a twin-cylinder mixer. Thereafter, molding was carried out in the same manner as in Example 1 to form a test piece of a resin plate. The evaluation results of the total content of the residual chlorine in the manufactured pellet and the obtained test piece are shown in Table 1.

Comparative Example 2

In the above (I), 9.07 parts by weight of PC, 0.0013 part by weight of the mixture prepared in Reference Example 3 [the total amount of lanthanum hexaboride and titanium nitride particles was 0.001 part by weight, lanthanum hexaboride particles: titanium nitride particles=8:2 (weight ratio)], 0.5 part by weight of S100A, 0.03 part by weight of PEPQ, 0.10 part by weight of VPG and 0.30 part by weight of UV1577 were uniformly mixed together by a super mixer. A resin raw material was manufactured in the same manner as in Example 1 except that 10 parts by weight of the obtained mixture and 90 parts by weight of PC were uniformly mixed together by a twin-cylinder mixer. Thereafter, molding was carried out in the same manner as in Example 1 to form a test piece of a resin plate. The evaluation results of the total content of the residual chlorine in the manufactured pellet and the obtained test piece are shown in Table 1.

Components of each symbol described above are given below.

PC: polycarbonate resin powder having a viscosity average molecular weight of 23,700 manufactured from bisphenol A and phosgene by interfacial polycondensation (Panlite L-1250WP (trade name) of Teijin Chemicals, Ltd.), total content of residual chlorine of 80 ppm)

PC(i): polycarbonate resin powder having a viscosity average molecular weight of 23,700 manufactured from bisphenol A and phosgene by interfacial polycondensation (total content of residual chlorine of 190 ppm)

S100A: partial ester of stearic acid and glycerin (Rikemal S-100A of Riken Vitamin Co., Ltd.)

VPG: full ester of pentaerythritol and an aliphatic carboxylic acid (comprising stearic acid and palmitic acid as main components) (Roxiol VPG861 of Cognis Japan Ltd.)

EW: full ester of pentaerythritol and an aliphatic carboxylic acid (comprising stearic acid and palmitic acid as main components) (Rikestar EW-400 of Riken Vitamin Co., Ltd.)

PEPQ: phosphonite-based heat stabilizer (Sandstab P-EPQ of Sandoz AG)

IRGF: phosphite-based heat stabilizer (Irgafos168 of Ciba Specialty Chemicals Holding Inc.)

UV1577: 2-(4,6-diphenyl-1,3,5-triazin-2-yl)-5-[(hexyl)oxy]phenol (Tinuvin1577 of Ciba Specialty Chemicals Holding Inc.)

UV79: 2-(2'-hydroxy-5'-t-octylphenyl)benzotriazole (Chemisob 79 of Chemipro Kasei Kaisha., Ltd.)

Acrylic resin-based dispersant: polyacrylate-based dispersant (EFKA-4530 of EFKA Additives Co., Ltd.)

TABLE 1

| | | | Ex. 1 | Ex. 2 | Ex. 3 | Ex. 4 | Ex. 5 | C. Ex. 1 | C. Ex. 2 |
|---|---|---|---|---|---|---|---|---|---|
| Composition | Component A | PC | 100 | 100 | 100 | | 100 | 100 | 100 |
| | | PC(i) | | | | 100 | | | |
| | Component B | Coated lanthanum hexaboride particles | 0.0023 | 0.0020 | 0.0018 | 0.0025 | 0.0022 | 0.0025 | |
| | Components other than component B | Lanthanum hexaboride | | | | | | | 0.0008 |
| | Component C | Titanium nitride particles | 0.0001 | 0.0002 | 0.0003 | 0.001 | 0.0002 | | 0.0002 |
| | Component D | S100A | 0.02 | 0.02 | | 0.5 | | 0.02 | 0.5 |
| | Component E | UV1577 | | 0.30 | | 0.30 | 0.30 | 0.30 | 0.30 |
| | | UV79 | 0.30 | | 0.30 | | | | |
| | Component F | Acrylic resin-based dispersant | 0.0006 | 0.0006 | 0.0005 | 0.0009 | 0.0006 | 0.0006 | 0.0003 |
| | Others | PEPQ | | 0.03 | | 0.03 | 0.03 | 0.03 | 0.03 |
| | | IRGF | 0.03 | | 0.03 | | | | |
| | | VPG | | 0.10 | | 0.10 | 0.10 | 0.10 | 0.10 |
| | | EW | 0.10 | | 0.10 | | | | |
| | Particle size distribution of PC (wt %) | Less than 180 μm | 20 | 20 | 20 | 10 | 20 | 20 | 20 |
| | | 180 μm or more and less than 710 μm | 46 | 46 | 46 | 48 | 46 | 46 | 46 |
| | | 710 μm or more | 34 | 34 | 34 | 42 | 34 | 34 | 34 |

TABLE 1-continued

| | | | Ex. 1 | Ex. 2 | Ex. 3 | Ex. 4 | Ex. 5 | C. Ex. 1 | C. Ex. 2 |
|---|---|---|---|---|---|---|---|---|---|
| Evaluation results | Total content of residual chlorine (ppm) | | 44 | 42 | 40 | 85 | 43 | 45 | 40 |
| | Total light transmittance (%) | Before moist heat treatment | 53.6 | 52.4 | 53.0 | 34.7 | 50.2 | 55.5 | 51.5 |
| | | After moist heat treatment | 55.1 | 54.0 | 56.0 | 37.6 | 51.3 | 56.0 | 59.1 |
| | | After moist heat treatment-before moist heat treatment | 1.5 | 1.6 | 3.0 | 2.9 | 1.1 | 0.5 | 7.6 |
| | Direct solar absorption (%) | Before moist heat treatment | 65.4 | 61.9 | 61.5 | 77.6 | 64.0 | 68.7 | 62.4 |
| | | After moist heat treatment | 61.8 | 60.8 | 58.3 | 75.3 | 63.3 | 66.3 | 46.7 |
| | | After moist heat treatment-before moist heat treatment | −3.6 | −1.1 | −3.2 | −2.3 | −0.7 | −2.4 | −15.7 |
| | Solar radiation heat acquisition rate | Before moist heat treatment | 0.47 | 0.49 | 0.50 | 0.39 | 0.48 | 0.45 | 0.49 |
| | | After moist heat treatment | 0.49 | 0.50 | 0.52 | 0.40 | 0.49 | 0.47 | 0.60 |
| | | After moist heat treatment-before moist heat treatment | 0.02 | 0.01 | 0.02 | 0.01 | 0.01 | 0.02 | 0.11 |
| | CIELab | L* Before moist heat treatment | 78.4 | 76.4 | 77.3 | 57.1 | 74.8 | 80.4 | 76.6 |
| | | L* After moist heat treatment | 79.3 | 77.3 | 79.0 | 58.8 | 75.6 | 80.8 | 80.7 |
| | | a* Before moist heat treatment | −9.6 | −7.7 | −5.9 | −2.2 | −8.3 | −11.4 | −7.5 |
| | | a* After moist heat treatment | −9.3 | −7.4 | −5.4 | −1.7 | −8.1 | −11.3 | −6.2 |
| | | b* Before moist heat treatment | 16.0 | 13.2 | 10.4 | 4.8 | 13.1 | 18.8 | 13.0 |
| | | b* After moist heat treatment | 16.8 | 13.6 | 10.4 | 4.8 | 13.4 | 20.1 | 12.0 |
| | Change in appearance | After moist heat treatment | no change | no change | no change | no change | no change | no change | change from green to light yellow green |

Ex.: Example C. Ex.: Comparative Example

EFFECT OF THE INVENTION

The resin composition of the present invention is superior in direct solar absorption and also direct solar absorption after a moist heat treatment. The resin composition of the present invention is superior in total light transmittance and also total light transmittance after a moist heat treatment. The resin composition of the present invention is excellent in color and also color after a moist heat treatment. That is, the resin composition of the present invention effectively blocks off heat rays from sunlight and is excellent in transparency, color and moist heat resistance.

The resin composition of the present invention has excellent moist heat resistance even when a polycarbonate resin as component A manufactured by interfacial polymerization in which a diphenol and phosgene are reacted with each other in the presence of methylene chlorine is used.

The molded article of the present invention effectively blocks off heat rays from sunlight as described above and is excellent in transparency, color and moist heat resistance.

INDUSTRIAL FEASIBILITY

The molded article of the present invention can be used as a window for living spaces and vehicles.

The invention claimed is:

1. A resin composition comprising (A) 100 parts by weight of a polycarbonate resin (component A), (B) 0.0001 to 0.05 part by weight of coated hexaboride particles, composed of a hexaboride particle of at least one element selected from the group consisting of Y, La, Ce, Pr, Nd, Sm, Eu, Gd, Tb, Dy, Ho, Er, Tm, Yb, Lu, Sr and Ca and a coating layer (component B), and (C) 0.0001 to 0.05 part by weight of nitride particles (component C).

2. The resin composition according to claim 1, wherein the hexaboride is La hexaboride.

3. The resin composition according to claim 1, wherein the coating layer is made from a metal oxide.

4. The resin composition according to claim 1, wherein the coating layer contains an oxide of at least one metal selected from the group consisting of Si, Ti, Al and Zr.

5. The resin composition according to claim 1, wherein the coating layer contains Si oxide.

6. The resin composition according to claim 1, wherein the coating layer consists of a pre-coating film of a surface modifier formed on the surface of the hexaboride particle and a Si-containing coating film formed on the pre-coating film.

7. The resin composition according to claim 1, wherein the component C is nitride particles of at least one metal selected from the group consisting of Ti, Zr, Hf, V, Nb and Ta.

8. The resin composition according to claim 1 which contains 0.01 to 2 parts by weight of a partial ester of a higher fatty acid and a polyhydric alcohol (component D) based on 100 parts by weight of the component A.

9. The resin composition according to claim 8, wherein the component D is an ester of an aliphatic saturated monocarboxylic acid having 10 to 30 carbon atoms and a polyhydric alcohol.

10. The resin composition according to claim 1 which contains 0.005 to 5 parts by weight of an ultraviolet absorber (component E) based on 100 parts by weight of the component A.

11. The resin composition according to claim 10, wherein the component E is a hydroxyphenyltriazine-based compound.

12. The resin composition according to claim 1, wherein the total amount of the residual chlorine is 100 ppm or less in terms of chlorine atom.

13. A molded article of the resin composition of claim 1.

14. The molded article according to claim 13 which is a sheet having a thickness of 2 to 50 mm.

15. The molded article according to claim 13 which is a window member for vehicles.

16. A method of manufacturing a resin composition, comprising the step of melt kneading particles containing 100 parts by weight of coated hexaboride particles, each composed of a hexaboride particle of at least one element selected from the group consisting of Y, La, Ce, Pr, Nd, Sm, Eu, Gd, Tb, Dy, Ho, Er, Tm, Yb, Lu, Sr and Ca and a coating layer (component B), 0.2 to 1,000 parts by weight of nitride particles (component C) and 10 to 200 parts by weight of a polymer dispersant (component F) with a polycarbonate resin (component A).

* * * * *